United States Patent [19]

Gore, Jr. et al.

[11] Patent Number: 5,826,029
[45] Date of Patent: Oct. 20, 1998

[54] SECURED GATEWAY INTERFACE

[75] Inventors: Robert Cecil Gore, Jr., Pflugerville; John Frederick Haugh, II, Austin, both of Tex.

[73] Assignee: International Business Machines Corporation, Armonk, N.Y.

[21] Appl. No.: 551,260

[22] Filed: Oct. 31, 1995

[51] Int. Cl.$^6$ .................................................. G06F 13/00
[52] U.S. Cl. .............................. 395/200.57; 395/200.33
[58] Field of Search ....................... 395/200.01, 200.02, 395/200.05, 200.06, 200.09, 200.12, 200.3, 200.47, 200.49, 200.55, 200.57, 200.59, 200.33

[56] References Cited

U.S. PATENT DOCUMENTS

| | | | |
|---|---|---|---|
| 3,798,605 | 3/1974 | Feistel | 380/25 |
| 4,672,572 | 6/1987 | Alsberg . | |
| 5,023,907 | 6/1991 | Johnson et al. . | |
| 5,032,979 | 7/1991 | Hecht et al. . | |
| 5,113,499 | 5/1992 | Ankney et al. . | |
| 5,241,594 | 8/1993 | Kung . | |
| 5,309,563 | 5/1994 | Farrand et al. . | |
| 5,321,841 | 6/1994 | East et al. . | |
| 5,339,403 | 8/1994 | Parker . | |
| 5,355,474 | 10/1994 | Thuraisngham et al. . | |
| 5,481,720 | 1/1996 | Loucks et al. | 395/187.01 |
| 5,506,961 | 4/1996 | Carlson et al. | 395/186 |
| 5,560,008 | 9/1996 | Johnson et al. | 395/680 |
| 5,590,199 | 12/1996 | Krajewski, Jr. et al. | 380/25 |
| 5,619,657 | 4/1997 | Sudama et al. | 395/200.06 |
| 5,623,601 | 4/1997 | Vu | 395/187.01 |

OTHER PUBLICATIONS

Cheswick, William R. et al., Firewalls and Internet Security: Repelling the Wily Hacker, Chapter 2–6, 1994.

Avolio, F. et al., "A Network Perimeter with Secure External Access", Proceedings of the Internet Society Symposium on Network and Distributed System Security, pp. 109–119, Feb. 1994.

Internet Firewalls: An Overview (Slide Presentation), Trusted Information Systems, Dec. 1994.

(List continued on next page.)

*Primary Examiner*—Tod R. Swann
*Assistant Examiner*—Conley B. King, Jr.
*Attorney, Agent, or Firm*—Richard A. Henkler; Andrew J. Dillon

[57] ABSTRACT

Accordingly, a computer implemented method, uniquely programmed computer system, and article of manufacture embodying computer readable program means all allow a customer on an external network to initiate an authorized business transaction utilizing internal business resources on an internal network without violating security firewalls. Specifically, the method directs an internal computer system to allow an external computer system to initiate a transaction request using internal resources without violating a security firewall between the internal computer system and the external computer system. The method includes a first step of authenticating a connection initiated by the internal computer system between the internal computer system and the external computer system, thereby establishing an authenticated connection. The second step includes calling by the external computer system a transaction request received by the external computer system. In response to calling the transaction request, the third step includes creating by the external computer system a string comprising the transaction request, arguments, and process environment variables for executing the transaction request. The fourth step includes transmitting by the external computer system the string to the internal computer system through the authenticated connection. The fifth step includes verifying by the internal computer system the transaction request. The sixth step includes recreating by the internal computer system the original process environment. The final step includes executing by the internal computer system the transaction request, thereby generating an output.

12 Claims, 4 Drawing Sheets

OTHER PUBLICATIONS

IBM Internet Connection Secured Network Gateway Version 2.1: Overview of Internet Firewall Technology, 1995.

Stempel, Steffen. "IpAccess—An Internet Service Access System for Firewall Installations", Proceedings of Symposium on Network and Distributed System Security, pp. 31–41, Feb. 1995.

Cheswick, Bill. "The Design of a Secured Internet Gateway", Proceedings of the 3rd USENIX Security Symposium, Sep. 1992.

Leech, Marcus. Socks Protocol Version 4, IETF Internet Draft, Jun. 1994.

Steiner, J.G. et al., "Kerberos: An Authentication Service for Open Network Systems", USENIX Association Winter Conference Proceedings, Feb. 1988.

Ranum, M. J. et al., "A Toolkit and Methods for Internet Firewalls", Proceedings of the Summer 1994 USENIX Conference, pp. 37–44, Jun. 1994.

Ganesan, Ravi. "BAfirewall: A Modern Firewall Design", Proceedings of the Internet Society Symposium on Network and Distributed System Security, pp. 99–108, Feb. 1994.

"Method of One–Way Authentication Via Passphrase", IBM Technical Disclosure Bulletin, vol. 36, No. 11, Nov. 1993, pp. 255–259.

FIG. 1

PRIOR ART

SECURED GATEWAY INTERFACE

BACKGROUND OF THE INVENTION

1. Field of the Invention

The present invention relates to secured gateway interfaces for networks and, more particularly, but without limitation, to a secured gateway interface for allowing an external network user to initiate an authorized transaction utilizing internal resources without violating security firewalls.

2. Background Information and Description of the Related Art

Figure 1:
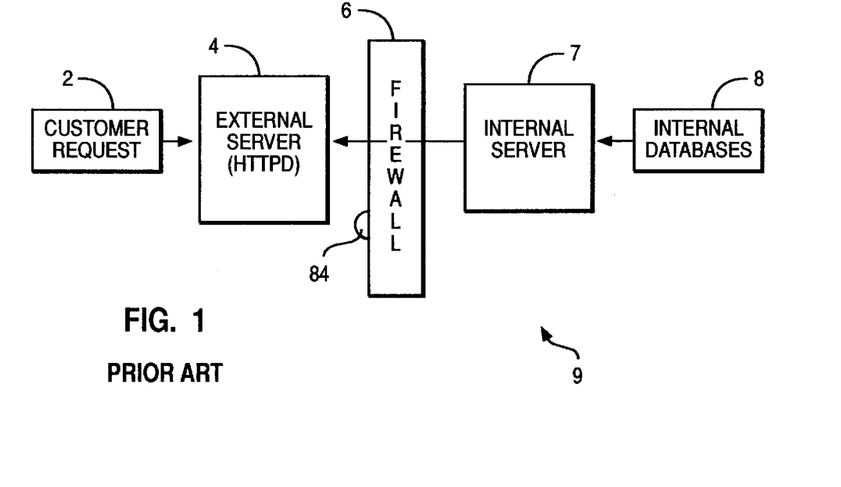
FIG. 1 illustrates a block diagram of a conventional network system for use in implementing the present invention.

FIG. 1 illustrates a prior art secured gateway interface (SGI) 9 having external server 4 (e.g., hypertext transfer protocol daemon HTTPD) for processing user/customer requests 2 from anyone on an external network (e.g., the INTERNET) and internal server 7 for processing requests from anyone on an internal network (e.g., anyone working for a particular corporation) and internal databases 8. SGI 9 further includes firewall 6 for preventing external initiation of internal transactions on internal databases 8. Accordingly, firewall 6 prohibits external customers from initiating a direct connection to the internal network (i.e., internal server 7 and internal databases 8). This restriction prohibits valid transactions, such as product and service purchase requests, because customers simply cannot initiate an internal transaction from the external network.

A conventional solution to the above described problem entails opening a specific port (e.g., port 84) in firewall 6 to inbound traffic. However, this solution clearly leaves the internal network subject to external attack. Another solution places all required resources (e.g., databases 8) on external server 4. However, this solution continues to prohibit execution of internal transactions. Further, external server 4 may not have enough storage to retain all required resources or the resources may be too confidential to be placed on the external server (e.g., customer data), limiting the services that can be provided.

Accordingly, there is great demand for a technique that allows a customer to initiate an authorized business transaction utilizing internal business resources without violating security firewalls.

SUMMARY

Accordingly, a computer implemented method, uniquely programmed computer system, and article of manufacture embodying computer readable program means allow a customer on an external network to initiate an authorized business transaction utilizing internal business resources on an internal network without violating security firewalls.

Specifically, the method directs an internal computer system to allow an external computer system to initiate a transaction request using internal resources without violating a security firewall between the internal computer system and the external computer system. The method includes a first step of authenticating a connection initiated by the internal computer system between the internal computer system and the external computer system, thereby establishing an authenticated connection. The second step includes calling by the external computer system a transaction request received by the external computer system. In response to calling the transaction requestion, the third step includes creating by the external computer system a string comprising the transaction request and process environment variables for executing the transaction request. The fourth step includes transmitting by the external computer system the string to the internal computer system through the authenticated connection. The fifth step includes verifying by the internal computer system the transaction request. The sixth step includes recreating by the internal computer system the original process environment. The final step includes executing by the internal computer system the transaction request, thereby generating an output.

Therefore, it is an object of the invention to create a secured gateway interface that is transparent to the user and the actual transaction program.

It is another object to allow a user to validly initiate a transaction through a firewall to an internal network using internal resources.

It is still another object to allow the user to initiate only a valid set of authorized transactions.

It is yet another object to securely authorize a connection between an internal computer system and an external computer system before the external computer system receives transaction requests from users.

It is a further object to store transaction programs inside the firewall without having to modify them.

These and other objects, advantages, and features will become even more apparent in light of the following detailed description and drawings.

DETAILED DESCRIPTION OF THE PREFERRED EMBODIMENT

The preferred embodiment includes a computer-implemented method, a uniquely programmed computer system, and a memory embodying detailed logic for directing an internal computer system to allow an external user/customer to initiate an authorized business transaction utilizing internal business resources without violating security firewalls.

Figure 2:
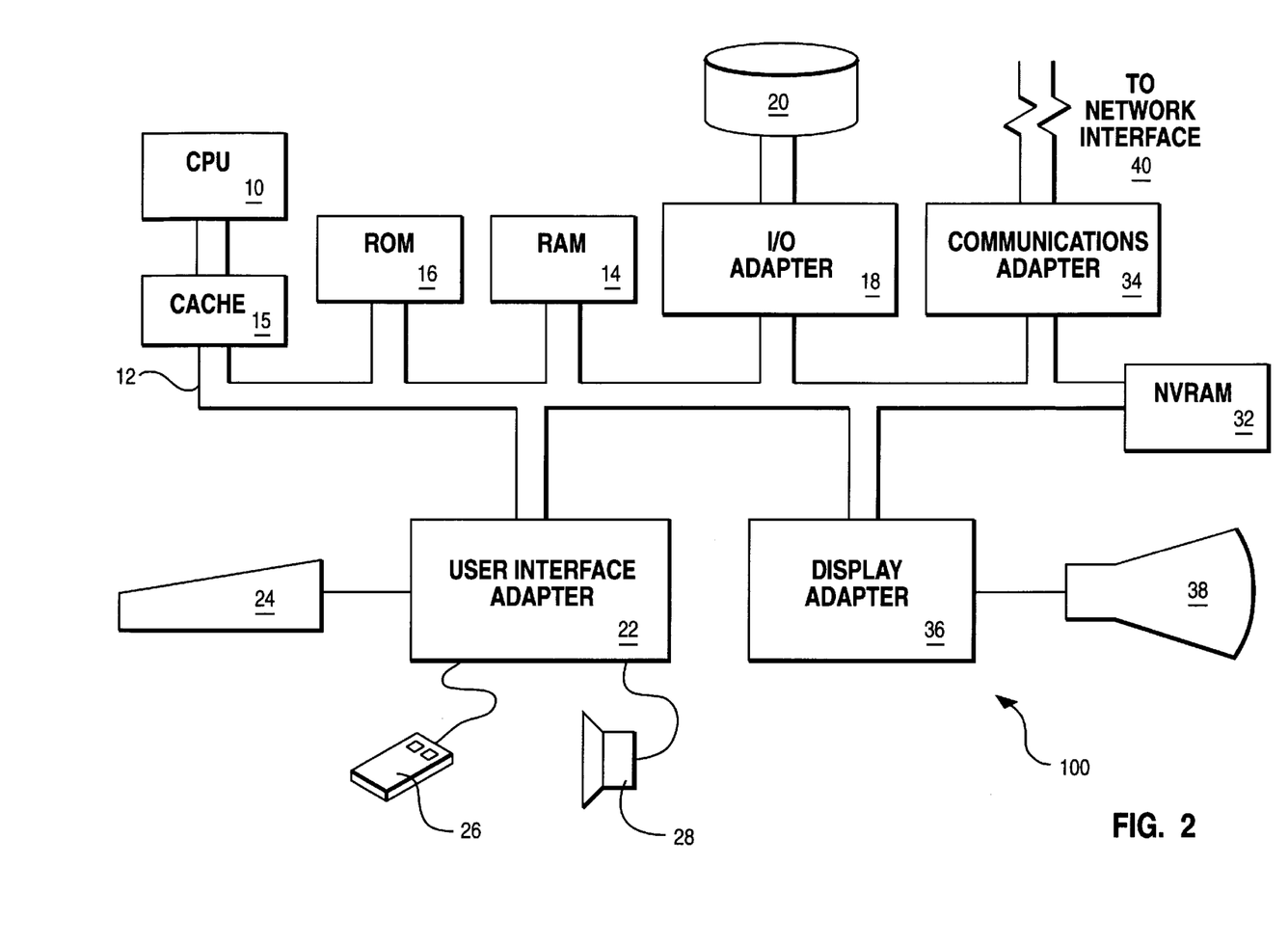
FIG. 2 illustrates a representative hardware configuration for implementing the present invention.

The present invention is practiced on a computer system illustrated in FIG. 2. Computer system 100 includes central processing unit (CPU) 10, such as an IBM's™ PowerPC™ 601 or Intel's™ 486 microprocessor for processing cache 15, random access memory (RAM) 14, read only memory 16, and non-volatile RAM (NVRAM) 32. One or more disks 20, controlled by I/O adapter 18, provide long term storage. A variety of other storage media may be employed, including tapes, CD-ROM, and WORM drives. Removable storage media may also be provided to store data or computer process instructions.

Instructions and data from the desktop of any suitable operating system, such as Sun Solaris™, Microsoft's Windows NT™, IBM's OS/2™, or Apple's System 7™, control CPU 10 from RAM 14. Accordingly, the desktop executes from RAM 14. However, in the preferred embodiment, an IBM RISC System/6000™ runs the AIX™ operating system, which is IBM Corporation's implementation of the UNIX operation system. As previously described, however, one skilled in the art readily recognizes that other hardware platforms and operating systems may be utilized to implement the present invention.

Users communicate with computer system 100 through I/O devices (i.e., user controls) controlled by user interface adapter 22. Display 38 displays information to the user, while keyboard 24, pointing device 26, and speaker 28 allow the user to direct the computer system. Communications adapter 34 controls communications between this computer system and other processing units connected to a network by network interface 40. Display adapter 36 controls communications between this computer system and display 38.

Figure 3:
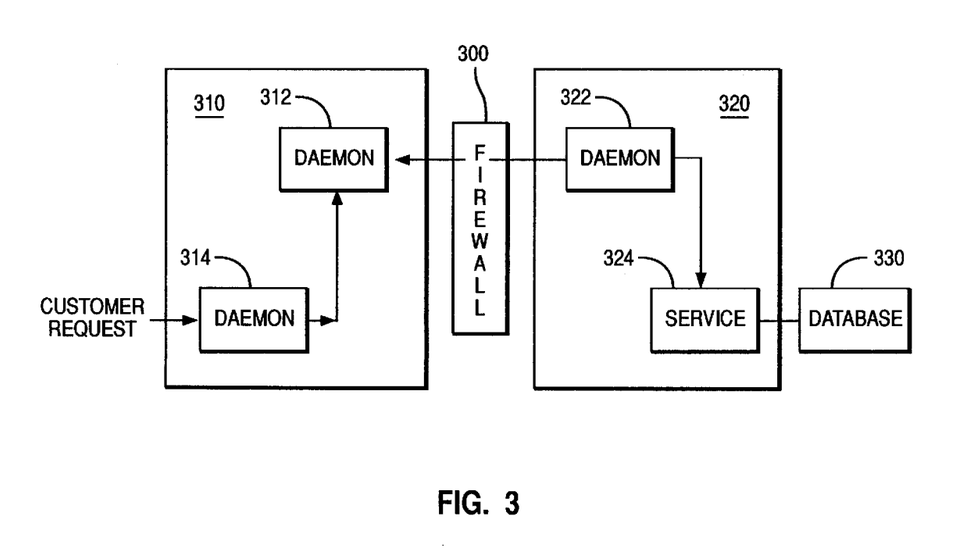
FIG. 3 illustrates a block diagram of a secured gateway interface (SGI) according to the preferred embodiment.

FIG. 3 illustrates a block diagram and process flow of a secured gateway interface (SGI) in accordance with the preferred embodiment. The SGI resides on a pair of servers 310 and 320, each being implemented on a computer system 100 (see FIG. 2). External server 310 resides outside firewall 300, while internal server 320 resides inside firewall 300. Firewall 300 is implemented using any suitable conventional firewall that prevents external transactions from passing through it to internal server 320. In the preferred embodiment, firewall 300 is a network router (e.g., Cisco router). However, one skilled in the art readily recognizes that firewall 300 could reside within internal server 320.

External server 310 manages communication with users/customers on an external network, such as the INTERNET. However, one skilled in the art realizes that any type of communication protocol could be used, such as SNA or X.25 on any public or private network. Internal server 320 manages communication of internal resources (e.g., database 330) on an internal network, such as an internal corporate information network. External server 310 runs outside daemon 312, while internal server 320 runs inside daemon 322, thereby enabling communication across firewall 300. A daemon is a long running computer program that waits for external events and executes a predefined series of actions whenever those events occur. Daemons listen for service requests and perform them when requested. External server 310 also runs daemon 314, which listens for service requests from the external network. Internal server 320 includes service program 324 for executing the desired internal transaction. Service program 324 and internal database 330 represent a set of computer programs that implement a business transaction (described in more detail herein).

Figure 4A:
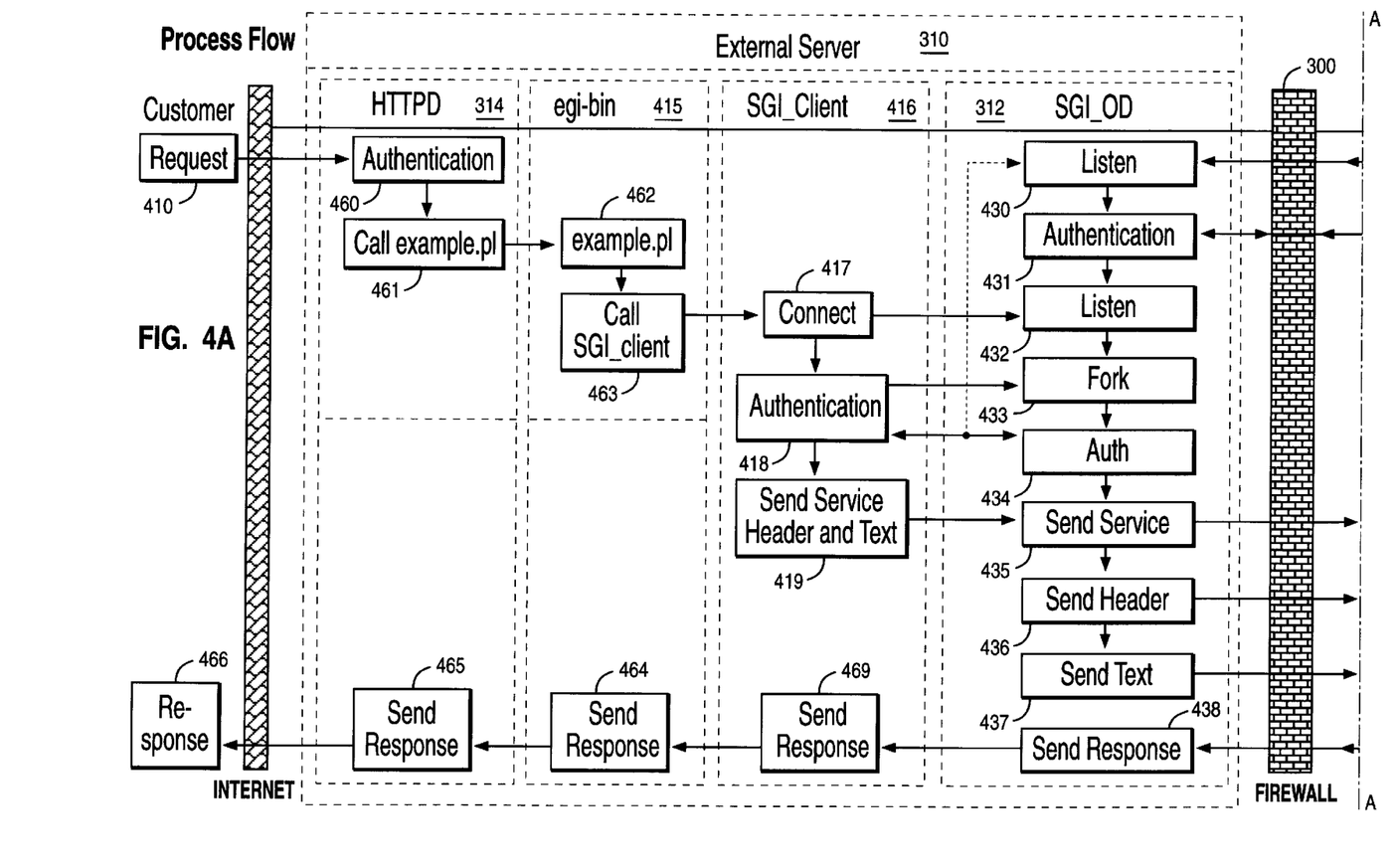
FIG. 4 illustrates a more detailed process flow diagram of the SGI previously illustrated in FIG. 3.
Figure 4B:
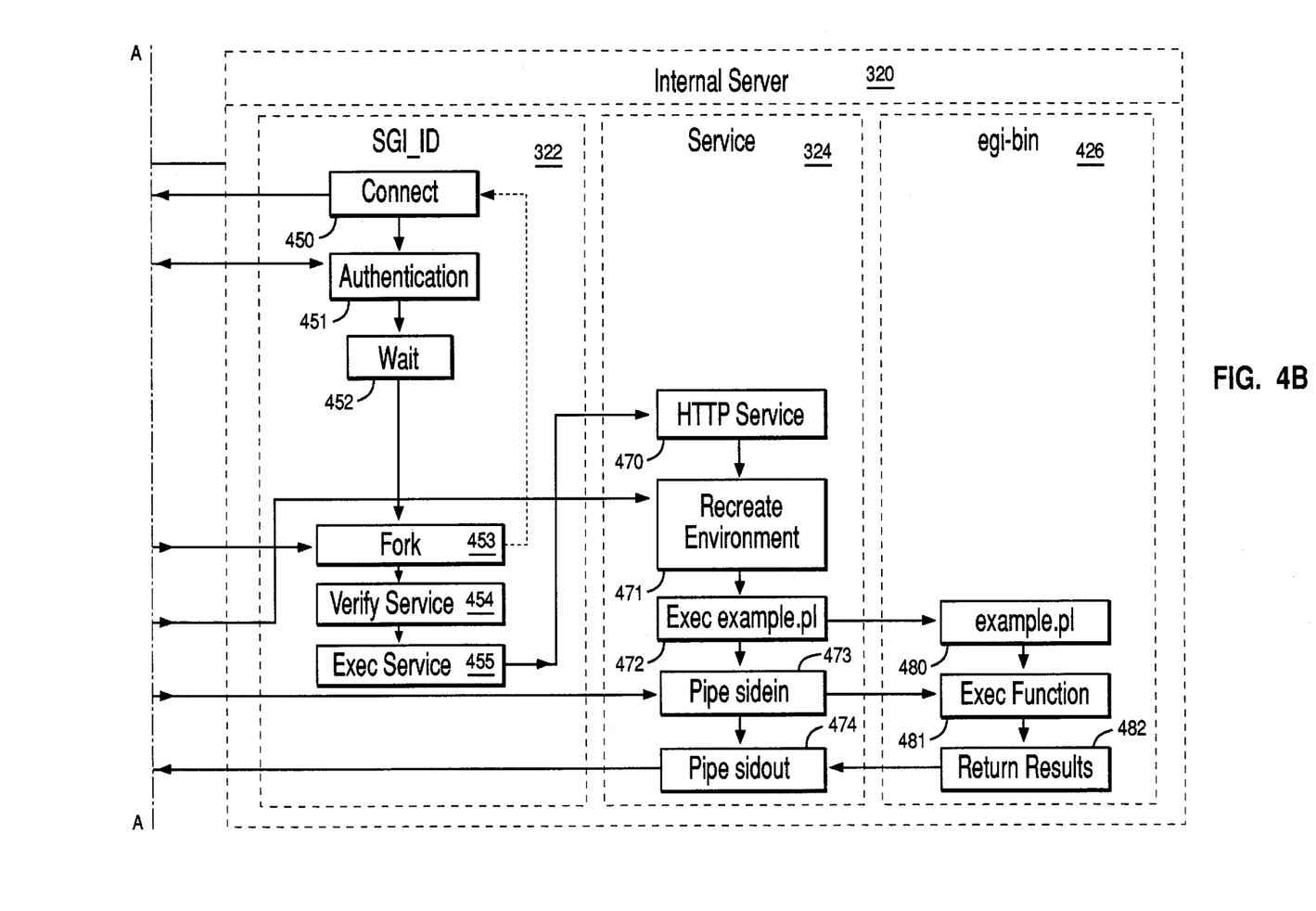

FIG. 4 illustrates a more detailed process flow diagram of the SGI previously illustrated in FIG. 3. External server 310 includes any suitable conventional communications protocol daemon 314, cgi-bin 415, sgi_client routine 416, and outside daemon 312. Outside daemon 312 contains client/server software for communicating with sgi_client routine 416 and inside daemon 322. Sgi_client routine 416 contains client/server software for communicating with outside daemon 312. Cgi-bin 415 is a directory of software that is executed by daemon 314. Specifically, in this example, cgi-bin 415 includes example.pl 462, which is a special perl script for communicating with sgi_client routine 416 (described in more detail herein). In the preferred embodiment, daemon 314 is a conventional Hypertext Transfer Protocol daemon (httpd) (also commonly known as a web server).

Internal server 320 includes inside daemon 322, service program 324, and cgi-bin 426. Service program 324 communicates with outside daemon 312, inside daemon 322, and executes cgi-bin routines (e.g., example.pl 480). In this example, example.pl 480 communicates with internal corporate databases (e.g. corporate database 320 in FIG. 3) in order to authorize the user/customer and execute the business transaction.

Before a customer/user can successfully request a transaction at 410, internal server 320 and external server 310 must properly connect. To do so, the external operating system executes outside daemon 312, identifying thereto a communication port and location of a password file residing on a filesystem (not shown) on external server 310. In turn, outside daemon 312 reads an eight character password from the password file, creates a socket at the identified communication port, and listens at that socket for a connect call from inside daemon 322. Therefore, outside daemon 312 assumes the role of a server and waits at 430 for the connect call from inside daemon 322, which assumes the role of a client. Further, outside daemon 312 creates a socket on a second port (daemon 312 communication port +1) and waits for a connection attempt from sgi_client routine 416 at 432 (described in more detail herein).

The internal operating system executes inside daemon 322, identifying thereto a communication port for connecting inside daemon 322 to outside daemon 312, the hostname of external server 310, the location of a password file residing in a filesystem (not shown) in internal server 320, and the location of a valid service file residing in a filesystem (not shown) in internal server 320. In turn, inside daemon 322 reads an eight character password from the password file, reads the service file and stores a table of valid services in memory, creates a socket on the identified communication port, and finally generates a standard connect call at 450 across firewall 300 to outside daemon 312, which is listening at 430. Because the connection is being initiated from an internal server, firewall 300 permits the connection.

After inside daemon 322 and outside daemon 312 connect, inside daemon 322 and outside daemon 312 must properly authenticate each other. To do so, inside daemon 322 initiates a call to the internal operating system to retrieve a current timestamp, transmits the timestamp to outside daemon 312, and waits for an authentication string in reply. Outside daemon 312 receives the timestamp and creates the authentication string by mangling (altering, described below) its eight character password with the timestamp provided by inside daemon 322, encrypting this mangled character string with a standard UNIX crypt command (or any suitable encryption algorithm, such as DES), and then transmitting the resulting authentication string to inside daemon 322 at 431. The following C code illustrates the process of mangling the eight character password with the timestamp. This "create_auth" code requires three arguments—the first is the timestamp (i.e., auth_time), the second is the password (i.e., "cred", which is a pointer to the password), and the third is a buffer to store the generated authentication string:

```
int create_auth (time_t, char * cred, char * p)
{
    char    buf[9];                         /* temporary buffer */
    int     i;
    bzero   (buf, sizeof(buf));             /* clear buffer */
    strcpy  (buf, cred);                    /* load buffer with password */
    /* mangle each character of the buffer */
    for (i = 0;i < 8;i++) {
        buf[i] ^ = (auth_time & 0177);      /* logically ANDing timestamp, then
                                               exclusive ORing result with each
                                               character in buffer; with each
                                               iteration
                                               modifying the timestamp */
        auth_time >>=4                      /* bit wise move timestamp */
    {
    for (i = 0;i < 8;i++)
        if (buf[i] == 0)                    /* since a valid character string cannot contain
                                               a NULL, chang all NULLS to 1 */
        buf[i] = 1;
    strcpy (p, crpyt (buf, "aa") + 2);      /* encrypt buffer using aa for
                                               the key */
                                            /* skip first two characters of
                                               encryption result (which is the
                                               key aa) */
                                            /* copy the encryption result to user
                                               supplied buffer pointed to by P */
    return 0;
}
```

Inside daemon 322 likewise mangles its password with the timestamp, encrypts it, and compares it with the authentication string provided by outside daemon 312. If the authentication strings match, the process is reversed and outside daemon 312 likewise authenticates inside daemon 322 (i.e., obtain a new timestamp from the external operating system, transmit the timestamp to inside daemon 322, inside daemon 322 mangles its password with the new timestamp, encrypts it, and transmits it back to outside daemon 312 for validation).

This authentication process uses an eight character password that is known by both outside and inside daemons 312 and 322, a character mangling function randomized by a timestamp, and an encryption process. Because of the mangling function, the above process produces a different encrypted authentication string for each authentication and every transaction. This significantly reduces its vulnerability to attack because a captured authentication string is worthless for any subsequent transaction.

After inside daemon 322 and outside daemon 312 have authenticated each other, inside daemon 322, which previously acted as the client, now assumes the role of a server and waits at 452 for outside daemon 312 to provide a service string at 453. Outside daemon 312 creates another socket on the second specified port and waits (listens) for a connection attempt from sgi_client routine 416 at 432. Therefore, outside daemon 312 assumes a dual role of a pseudo client with respect to inside daemon 322 (information is passed between them) and a server with respect to sgi_client routine 416.

Daemon 314 is now prepared to accept customer request 410. The customer request could be, for example, a transaction to purchase research information on a particular stock or money market. At 410, the customer decides to execute the following transaction request: http://external_server/cgi-bin/example.pl?stock1+stock2 by clicking on a specific icon or highlighted phrase on the customer's system, which is running an http client application user interface. The http client user interface typically asks the user for detailed transaction information (e.g. which stock or money market) as well as billing information (e.g. a credit card number). The user may also be required to enter his or her userid and password if the requested service is only provided to authorized users.

The format of the transmitted user input depends on the type of Hyper Text Markup Language (HTML) form used to implement the transaction. There are two types of conventional HTML forms: A "GET" form places all user input on the command line. Therefore, stock1, stock2 and any other user input would become part of the command line:

. . . /cgi-bin/example.pl?stock1+stock2+mastercard+expdate

However, because the command line will be transmitted across the network in clear text, it is not advisable to transmit the customer's charge card number and expiration date across the network. Therefore, the "PUT" type of HTML form with encryption is used so that the charge card number and expiration date are safely sent across the network. After providing all of this information, the http client application sends the request via http to external server 310 at 410.

At 460, daemon 314 authenticates the customer's password according to a commonly known and installed HTTP authentication technique (e.g., encrypting the customer's password with a standard UNIX crypt command and comparing the result with a password entry in an http password file residing in daemon 314). If the userid and password are valid, at 461, daemon 314 recognizes the "PUT" form, automatically decrypts the character stream, and creates an appropriate UNIX process environment. Daemon 314 contains a conventional, commonly known http configuration file (not shown) for creating a standard UNIX process environment, including PATH, USERNAME, LOGNAME, and AUTHTYPE variables. Later, httpsvc 470 recreates this process environment at 471 (described herein). Once the process environment has been created, daemon 314 executes example.pl 462 (which should reside in cgi-bin 415), transmitting thereto any required arguments (e .g. stock1 and stock2) and user input to a standard input stream of example.pl 462.

Assuming that example.pl 462 does reside in cgi_bin 415, if firewall 300 did not exist, example.pl 462 would directly communicate with internal database 330 (see FIG.

3) and perform the desired transaction. However, because firewall 300 does exist and prevents example.pl 462 from directly communicating with internal database 330, example.pl 462 is not the actual transaction program. Rather, the actual transaction program resides in cgi-bin 426 as example.pl 480, which is inside firewall 300. Accordingly, cgi-bin 415 contains "special" perl scripts (e.g., example.pl 462) that are executed using the same command that would execute the actual transaction programs residing in cgi-bin 426. Alternatively, when external server 310 provides many services, each of which will require a "special" perl script to call sgi_client routine 416 in the same manner, example.pl 462 may be a symbolic link (i.e., an indirect filename reference) to a single perl script residing in cgi-bin 415. Importantly, the requests available to the customer are limited to the perl scripts and corresponding transactional programs residing in cgi_bin 415 and cgi_bin 426, respectively.

The perl script example.pl 462 places all arguments passed to it from daemon 314 into the process environment (e.g. SGIARG1=stock1; SGIARG2=stock2), places its name (the name by which it was called, in this case example.pl) into the process environment (e.g. SGICMD=example.pl), executes a UNIX env command (which dumps the process environment variables) and finally places all the process environment variables into a header string. The header string now appears as, for example:
"PATH=/bin:/usr/bin\nAUTHTYPE=PEM\nUSERNAME= JohnDoe\nSGIA RG1=stock1\nSGIARG2=stock2\= nSGICMD=example.pl").

Next, at 463, perl script example.pl 462 calls the external operating system to retrieve the designated second port (daemon 312 communication port +1), executes sgi_client routine 416, transmitting thereto the type of service requested (e.g. httpsvc), the designated second port, the external server hostname, the header string, and the customer's userid. Example.pl 462 also transmits as standard input any standard input character stream (e.g., the text of user input) to sgi_client routine 416. Later, example.pl 462 will pass any output received from the sgi_client routine 416 to daemon 314 at 469.

When sgi_client routine 416 executes using the information transmitted to it at 463, sgi_client routine 416 establishes an authenticated connection to outside daemon 312. To do so, at 417, sgi_client routine 416 reads an eight character password from a private client password file (not shown) residing on external server 310 and establishes a connection to outside daemon 312 at the designated second port, which is listening at 432 from the second socket connection. At 433, outside daemon 312 creates a copy of itself and executes it (e.g. a UNIX process fork). The parent process gives the socket connection to the child process and returns to 430 to listen for another call from inside daemon 322.

At 434, the child process authenticates sgi_client routine 416. To do so, outside daemon 312 also reads an eight character password from a private client password file (not shown) residing on external server 310. Outside daemon 312 initiates a call to the external operating system to retrieve a current timestamp, transmits the timestamp to sgi_client routine 416 at 432, and waits for an authentication string in reply. Sgi_client routine 416 receives the timestamp and creates an authentication string by mangling its eight character password with the timestamp provided by outside daemon 312, encrypting this mangled character string with a standard UNIX crypt command, and then transmitting the resulting authentication string to outside daemon 312 at 434.

Outside daemon 312 likewise mangles its password with the timestamp, encrypts it, and compares it with the authentication string provided by sgi_client routine 416. If the authentication strings match, sgi_client routine 416 is authenticated.

At 419, if authentication is successful, sgi_client routine 416 transmits the type of service requested to outside daemon 312. In this example, sgi_client routine 416 always requests an HTTP service because sgi_client routine 416 was indirectly called by HTTP daemon 314. The special perl script (i.e., example.pl 462) previously executed sgi_client routine 416 using an argument indicating that the service requested is "httpsvc". Outside daemon 312, in turn, transmits the "httpsvc" service request to inside daemon 322 at 435.

At 452, inside daemon 322 waits for the service request to be received from outside daemon 312. At 453, inside daemon 322 receives the service request from outside daemon 312, creates a duplicate image of itself and executes it (e.g a UNIX process fork). The parent process gives the network socket connection to the child process and returns to 450 to initiate another connection to outside daemon 312. At 454, the child process validates the requested service with the list of valid executable services (e.g., httpsvc) residing in the table in memory and the full directory path to those services. If the requested service is not within the list of valid services, it will be denied. Accordingly, even if an unauthorized user gained access through outside daemon 312 to inside daemon 322, he/she would be limited to the services residing within the list of valid services.

If the service request is valid, at 455, inside daemon 322 calls a UNIX exec command (i.e., overlays itself with the new service program and executes) the requested service and gives the network socket connection to httpsvc 470. Httpsvc 470 adds one additional environment variable to the process environment, which is the name of outside daemon 312. The SCI adds the additional environment variable so that example.pl 480 can, if needed, determine that the SGI executed example.pl 480, rather than http daemon 314.

As a side note, outside daemon 312, inside daemon 322, sgi_client routine 416, and httpsvc 470 each have accounting and error logging files. Each have debugging and trace arguments that cause differing amounts of information to be placed in the error and accounting logs. In addition, if the tracing argument is set by sgi_client routine 416, then outside_daemon 312, inside daemon 322, and httpsvc 470 will all trace that particular transaction in their respective error logfiles, regardless of how tracing was set as each was originally executed.

At 436, outside daemon 312 transmits the previously created header to service program 324, which receives it at 471. In response, service program 324 parses the header (which contains the original process environment variables) into variable=value strings and recreates the original process environment defined in example.pl 462. Service program 324 determines the appropriate program to call in cgi-bin 426 from the header variable SGICMD=example.pl, creates communication channels (e.g. pipes) for communicating with example.pl 480, and calls example.pl 480 at 472. At 437, outside daemon 312 transmits the standard input character stream (e.g., text) to service program 324. At 473, service program 324 transmits the text to the standard input of example.pl 480.

At this point, because service program 324 recreated the original process environment at 471 (which was originally created at 462), example.pl 480 believes it is being executed at 472 by http daemon 314, rather than the SGI (although optionally it can determine that the SGI called it from the additional environment variable added to the header by httpsvc 470). According, the SGI is transparent to both the customer, http daemon 314, and the actual transaction program residing in example.pl 480. Therefore, neither http daemon 314 nor the transaction program residing in example.pl 480 need be altered.

All the information is now present for example.pl 480 to execute the internal transaction on database 330 at 481. Once the transaction is complete (whether successful or not), at 481, the output from the transaction is returned to the customer. At 482, example.pl 480 receives the output from the transaction and transmits it to pipe 474 of service program 324. At 474, service program 324 transmits the output to outside daemon 312. At 438, outside daemon 312 transmits the output to sgi_client routine 416. At 464, sgi_client routine 416 transmits the output to the special perl script example.pl 462. At 465, example.pl 462 transmits the output to daemon 314. At 466, daemon 314 transmits the output to the customer.

Accordingly, a customer initiated transaction can be securely transmitted from daemon 314 to outside daemon 312, from outside daemon 312 to inside daemon 322 for validation at 454 and processing at 481, and finally the output returned to the customer at 466. The customer request and text are made available through firewall 300 to the internal transaction processing, all under the complete control of the SGI, yet completely transparent to the customer. Because inside daemon 322 performs authentication at 451, strictly enforces the services available to external network at 454, and optionally performs user authorization at 481, compromise of external server 310 poses a very minimal internal security risk and in no way compromises the internal network.

Using this particular embodiment, existing http servers can implement SGI with little or no modifications to existing cgi-bin commands. The SGI is completely hidden and will automatically support even sophisticated http servers. One can add additional security and support for business transactions with little modification to the current http server. Because the transactions (programs like example.pl) available to the external network are limited to the perl scripts and transaction programs residing in cgi-bin 415 and cgi-bin 426, respectively, and because internal server 320 would normally be under strict corporate control and not easily modified by internal developers, the SGI also makes it difficult for internal developers to make internal transactions available to external customers without corporate review and consent.

While the invention has been shown and described with reference to particular embodiments thereof, it will be understood by those skilled in the art that the foregoing and other changes in form and detail may be made therein without departing from the spirit and scope of the invention, which is defined only by the following claims. For example, an alternative embodiment incorporates the functionality of sgi_client routine 416 and outside daemon into daemon 314. This would provide greater performance, but would make the httpd implementation proprietary and improvements thereto hard to incorporate.

What is claimed is:

1. A method for directing an internal computer system to allow an external computer system to initiate a transaction request using internal resources without violating a security firewall between the internal computer system and the external computer system, comprising the steps of:

authenticating a connection initiated by the internal computer system between the internal computer system and the external computer system, thereby establishing an authenticated connection;

calling by the external computer system a transaction request received by the external computer system;

in response to calling the transaction request, creating by the external computer system an original process environment containing process environment variables, and creating a string comprising the transaction request and the process environment variables for executing the transaction request;

transmitting by the external computer system the string to the internal computer system through the authenticated connection;

verifying by the internal computer system the transaction request;

recreating by the internal computer system the original process environment; and executing by the internal computer system the transaction request, thereby generating an output.

2. The method according to claim 1 further comprising the steps of:

(a) reading by the external computer system a first password and first communication port;

(b) creating by the external computer system a first socket at the first communication port and listening at the first socket for a connect call from the internal computer system;

(c) reading by the internal computer system a second password and a second communication port; and (d) creating by the internal computer system a second socket at the second communication port and sending a connect call to the external computer system through the second socket, thereby establishing a connection.

3. The method according to claim 2 wherein the authenticating step comprises the steps of:

(e) sending a unique timestamp by the internal computer system to the external system through the second socket;

(f) mangling by the external computer system the first password with the unique timestamp;

(g) encrypting the mangled first password with an encryption algorithm, thereby creating a first password string;

(h) transmitting by the external computer system to the internal computer system the first password string;

(i) repeating steps (f) through (g) by the internal computer system using the second password, thereby creating a second password string; and (j) comparing by the internal computer system the first password string with the second password string.

4. The method according to claim 3 wherein the mangling step comprises the steps of:

logically ANDing the timestamp with a hexadecimal number 0177 to produce a unique result; and logically exclusive ORing the unique result with each character of the first password, thereby producing the mangled first password.

5. The method according to claim 4 wherein the encrpytion step comprises the step of:

encrypting each character of the mangled second password with a key, thereby creating the password string.

6. The method according to claim 5 wherein the calling step comprises the steps of:

sending by an external network the transaction request to the external computer system, wherein the transaction request contains input data, arguments, and a command for executing a transaction program; and in response to receiving the transaction request by the external computer system, defining by a first daemon a process environment containing the process environment variables.

7. The method according to claim 6 further comprising the step of:

in response to calling the transaction request by the external computer system, calling the command;

in response to calling the command, executing a script, transmitting thereto the user input data, arguments, and transaction request; and creating by the script the string, wherein the string comprises the command, arguments, and the process environment variables for executing the transaction request.

8. The method according to claim 7 further comprising the step of:

calling by the script a client routine residing in the external computer system, passing thereto the user input data, a third communication port for connecting to a second daemon residing on the external computer system, and identifier that identifies the type of transaction request, and the string.

9. The method according to claim 8 further comprising the step of:

in response to receiving a call by the script, authenticating by the second daemon the client routine;

forking by the second daemon, passing the third socket connection to a child process, whereby a parent process listens at the first socket connection for calls from the internal computer system; and in response to authenticating the client routine, transmitting by the child process the type of transaction request to a third daemon residing on the internal computer system.

10. The method according to claim 9, wherein the verifying step comprises the step of:

reading by the third daemon a valid services table stored in memory on the internal computer system; and comparing the type of transaction request received from the child process with the valid service table, wherein if the type is found in the valid service table, the transaction request is verified.

11. A uniquely programmed system for directing an internal computer system to allow an external computer system to initiate a transaction request using internal resources without violating a security firewall between the internal computer system and the external computer system, comprising:

means for authenticating a connection initiated by the internal computer system between the internal computer system and the external computer system, thereby establishing an authenticated connection;

means for calling by the external computer system a transaction request received by the external computer system;

in response to calling the transaction request, means for creating by the external computer system an original process environment containing process environment variables, and means for creating a string comprising the transaction request, the arguments, and the process environment variables for executing the transaction request;

means for transmitting by the external computer system the string to the internal computer system through the authenticated connection;

means for verifying by the internal computer system the transaction request;

means for recreating by the internal computer system the original process environment; and means for executing by the internal computer system the transaction request, thereby generating an output.

12. An article of manufacture, comprising:

a computer usable medium having computer readable program code means embodied therein for causing an internal computer system to allow an external computer system to initiate a transaction request using internal resources without violating a security firewall between the internal computer system and the external computer system, the computer readable program code means in said article of manufacture comprising:

computer readable program means for authenticating a connection initiated by the internal computer system between the internal computer system and the external computer system, thereby establishing an authenticated connection;

computer readable program means for calling by the external computer system a transaction request received by the external computer system;

in response to calling the transaction request, computer readable program means for creating by the external computer system an original process environment containing process environment variables, and computer readable program means for creating a string comprising the transaction request and, the process environment variables for executing the transaction request;

computer readable program means for transmitting by the external computer system the string to the internal computer system through the authenticated connection;

computer readable program means for verifying by the internal computer system the transaction request;

computer readable program means for recreating by the internal computer system the original process environment; and computer readable program means for executing by the internal computer system the transaction request, thereby generating an output.

* * * * *